(12) United States Patent  
Tajima

(10) Patent No.: US 6,969,201 B2
(45) Date of Patent: Nov. 29, 2005

(54) WHEEL BEARING DEVICE

(75) Inventor: Eiji Tajima, Shizuoka-ken (JP)

(73) Assignee: NTN Corporation, Osaka-Fu (JP)

( * ) Notice: Subject to any disclaimer, the term of this patent is extended or adjusted under 35 U.S.C. 154(b) by 83 days.

(21) Appl. No.: 10/457,777

(22) Filed: Jun. 10, 2003

(65) Prior Publication Data
US 2004/0252926 A1 Dec. 16, 2004

(30) Foreign Application Priority Data
Jun. 21, 2002 (JP) .............................. 2002-181787

(51) Int. Cl.$^7$ .......................................... F16C 19/08
(52) U.S. Cl. ...................................... 384/544; 384/913
(58) Field of Search ................................ 384/544, 589, 384/537, 912, 913; 29/898.061, 898.062, 29/898.064, 898.07

(56) References Cited

U.S. PATENT DOCUMENTS 5,672,014 A * 9/1997 Okita et al. .................. 384/913
5,975,765 A * 11/1999 Kawamura ................... 384/544
6,485,187 B1 * 11/2002 Meeker et al. .............. 384/544
6,497,515 B1 * 12/2002 Sahashi et al. ............. 384/544

FOREIGN PATENT DOCUMENTS

JP        2001-18605        1/2001

* cited by examiner

Primary Examiner—Thomas R. Hannon
(74) Attorney, Agent, or Firm—Arent Fox PLLC

(57) ABSTRACT

A wheel bearing device at low cost with higher durability is provided. An outer joint member of a constant velocity joint is fitted to an inner periphery of a wheel hub, and the outer joint member and the wheel hub are united by plastic deformation in radially outward direction of a stem part of the outer joint member. The outer joint member is made of a steel material chiefly comprising iron, 0.5 to 0.7 weight % of carbon, 0.1 to 1.5 weight % of silicon, 0.6 to 1.0 weight % of manganese, and inevitable impurities.

6 Claims, 4 Drawing Sheets

WHEEL BEARING DEVICE

BACKGROUND OF THE INVENTION

1. Field of the Invention

The present invention relates to a wheel bearing device of a vehicle such as an automobile.

2. Description of the Related Art

Wheel bearing devices are generally classified into those for drive-wheel applications and driven-wheel applications. A drive wheel bearing device commonly comprises a wheel hub and a double-row bearing, or a unit of a wheel hub, bearing, and constant velocity joint.

One of the drive wheel bearing device designs has a construction in which one of the double-row inner races of the bearing is formed on an outer periphery of the wheel hub, while the other one is formed on an outer periphery of an outer joint member of the constant velocity joint. In this type of bearing device, the wheel hub and constant velocity joint need to be joined together to achieve relative positioning of the double-row inner races and to maintain certain preload applied to the inside of the bearing. There has been a new method of joining them by swaging as shown, e.g., in Japanese Patent Laid-Open Publication No. 2001-18605, which is considered advantageous in terms of effective use of axial space of the bearing and enhancement of the joint rigidity. With this method, a stem part of the outer joint member is expanded radially outward by plastic deformation so that it firmly engages with irregularities formed in the inner periphery of the wheel hub.

With such swaging, the portion of the stem part that is expanded need to have lowered hardness, so as to achieve good operability of the swaging and to secure sufficient joint strength. On the other hand, some parts of the outer joint member such as seal lands or portions that make contact with seal lips and inner races on the outer peripheral surface, and track grooves formed in the inner peripheral surface of the outer joint member need to have high hardness for securing fatigue durability.

Thus the outer joint member in the above swaged design needs to be formed with high-hardness portions and low-hardness portions. However, forming one member with varying hardnesses requires complicated fabrication processes, leading to higher costs. For example, if case hardening steel or carburized bearing steel such as SCM420 or the like is used for the base material of the outer joint member, its hardness can be increased by carburizing quenching after forging the steel into the shape of the outer joint member. In this case, the stem part needs to undergo decarburizing treatment and annealing after hardening so as to decrease its hardness, and the cost is accordingly high.

High carbon chromium bearing steel such as SUJ2 or the like may also be used for the sake of longer rolling life, but it will be difficult to smoothly expand the stem part radially outward because of the high material hardness even before the heat treatment. Moreover, since the outer joint member is most commonly formed by forging, the high carbon chromium bearing steel having high hardness is not suitable for its base material.

Furthermore, both bearing steels noted above contain expensive elements such as chromium and molybdenum, and the high cost of steel material itself will raise the overall cost of the wheel bearing device.

BRIEF SUMMARY OF THE INVENTION

In view of the above, an object of the present invention is to provide a wheel bearing device that can be fabricated at low cost with good swaging workability and high swaged joint strength.

A wheel bearing device according to the invention includes an outer member formed with double-row outer races on an inner periphery thereof, an inner member having a wheel hub having a flange for attachment of a wheel and a fitting member fitted to an inner or outer periphery of the wheel hub, the inner member being formed with double-row inner races on an outer periphery thereof, and double-row rollers interposed between the inner and outer races. One of the wheel hub and the fitting member that is located inside is expanded radially outward by plastic deformation so as to unite the wheel hub and the fitting member.

In the wheel bearing device as configured, at least one of the wheel hub and the fitting member is made of a steel material comprising iron, 0.5 to 0.7 weight % of carbon, 0.1 to 1.5 weight % of silicon, 0.6 to 1.0 weight % of manganese, and inevitable impurities.

Since this steel material is a medium-carbon steel, it is lower in material hardness before heat treatment than, for example, high carbon chromium bearing steel. Therefore, it is possible to carry out plastic deformation of portions where no heat treatment is applied, and it also offers good workability in plastic deformation thereof. The heat treatment may be achieved by induction hardening which does not require annealing or decarburizing process, whereby rolling or sliding portions can be hardened to have high fatigue strength. Furthermore, because the steel material does not contain expensive elements such as chromium or molybdenum, the base material itself is inexpensive, whereby the overall cost of the bearing device can be reduced.

Preferably, silicon may be contained in the steel material in an amount of 0.6 to 1.2% by weight.

The steel material may preferably have an austenite grain size number of 3 or more so as to increase fatigue strength in non-heat treated portions for prolonged life of the constituent parts.

One of the wheel hub and outer joint member that is located inside does not undergo heat treatment for easy plastic deformation. Ductility of portions to be plastic deformed is thereby improved, and workability in this portions and joint strength are increased due to high ductility, The joint strength can further be increased by making the outer peripheral surface of the inner one of the wheel hub and outer joint member which is subjected to plastic deformation engage with heat-treated or hardened irregularities on the opposite surface.

In one specific example of such a wheel bearing device, the fitting member may be an outer joint member of a constant velocity joint. In this case, one of the wheel hub and the outer joint member is arranged inside. Either way, the double-row inner races may be formed on outer peripheries of the wheel hub and the outer joint member (see FIG. 1).

In another example, the fitting member may be an inner ring fitted to the wheel hub. In this case, the double-row inner races may be formed on outer peripheries of the wheel hub and the inner ring (see FIG. 2), or, on outer surfaces of two-inner rings fitted to the outer periphery of the wheel hub (see FIG. 3).

DETAILED DESCRIPTION OF THE INVENTION

Preferred embodiments of the present invention will be hereinafter described with reference to FIG. 1 to FIG. 4.

Figure 1:
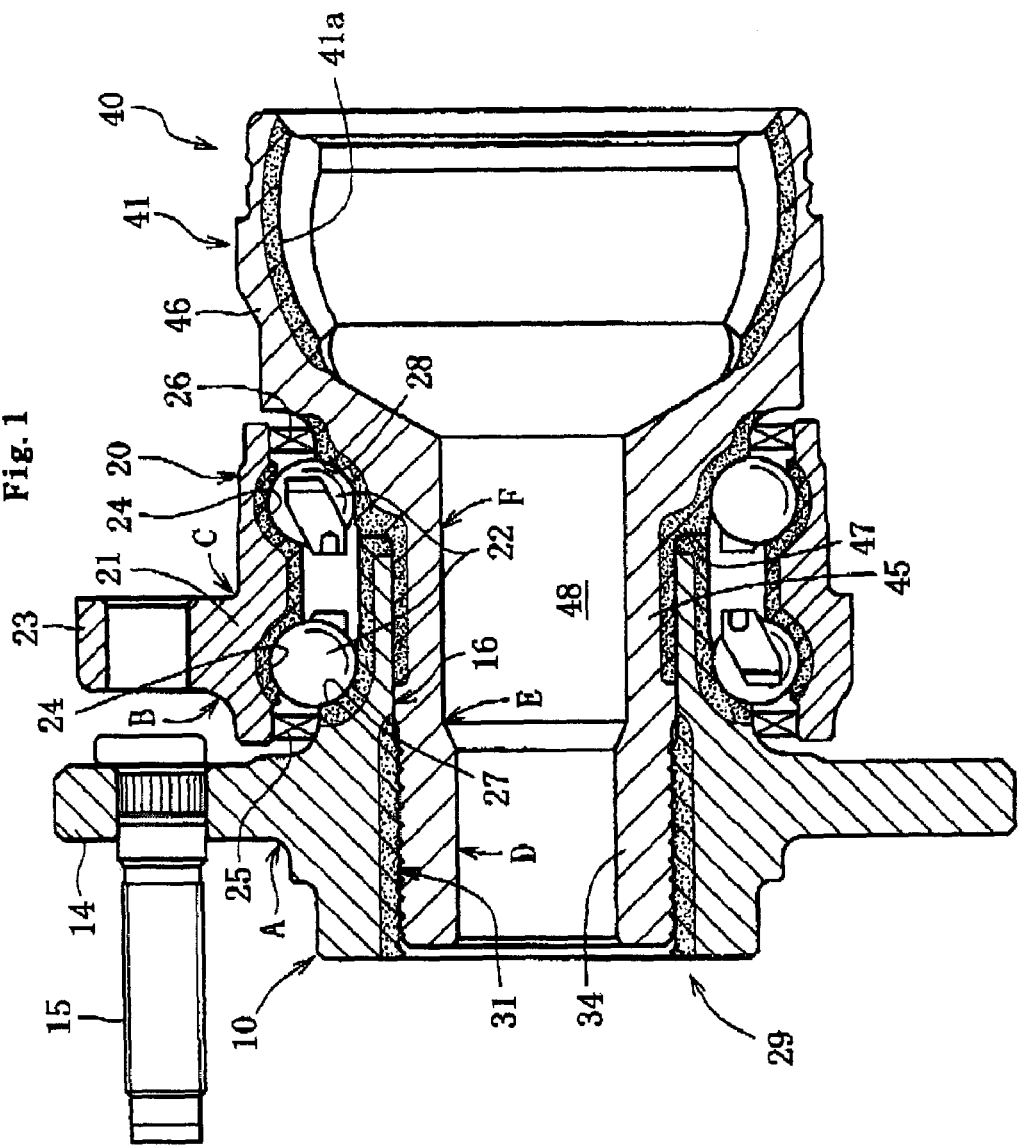
FIG. 1 is a cross-sectional view of a wheel bearing device according to one embodiment of the invention.

FIG. 1 illustrates a drive wheel bearing device according to the invention. The wheel bearing device is made as one unit of a wheel hub 10, a bearing 20, and a constant velocity joint 40. "Outboard side" and "inboard side" in the following description refer to the outer side and inner side of the bearing device mounted on a vehicle, which correspond to the left side and right side in the drawing, respectively.

The wheel hub 10 is a hollow member having an axial bore penetrating the hub in the center thereof. A flange 14 is formed at one end of the wheel hub 10 on the outboard side for attaching a wheel (not shown). In the flange 14 are implanted wheel hub bolts 15 at circumferentially evenly spaced locations for fixedly attaching a wheel disc. An outboard-side inner race 27 is formed on an outer peripheral surface of the wheel hub 10 on the inboard side relative to the flange 14.

The constant velocity joint 40 transmits torque from the drive shaft via its inner joint member and torque transmission balls (both not shown) to its outer joint member 41. A plurality of track grooves 41a are formed in the inner periphery of the outer joint member 41, which form a plurality of ball tracks together with a plurality of corresponding track grooves in the outer periphery of the inner joint member. Torque transmission balls are arranged in these ball tracks and held in the same plane by a cage (not shown).

The outer joint member 41 is a fitting member that fits to the inner periphery of the wheel hub 10 and includes a stem part 45 and a mouth part 46 made as one-piece. The stem part 45 is fitted to the inner periphery of the wheel hub 10 until the shoulder 47 of the mouth part 46 abuts on the inboard-side end face of the wheel hub 10, whereby relative positioning of the wheel hub 10 and outer joint member 41 is achieved in the axial direction. This abutment also defines the distance between two inner races 27 and 28. The inboard-side inner race 28 is formed on an outer peripheral surface of the mouth part 46 near the shoulder 47. The stem part 45 is tubular with an axial bore 48 that communicates to the bottom of the cup-shaped mouth part 46.

The outer joint member 41 is formed by forging, after which it undergoes partial heat treatment. Dotted patterns in FIG. 1 indicate portions that are hardened by the heat treatment: The region covering the shoulder 47, inboard-side inner race 28, and a seal land with which a seal lip of a seal 26 makes sliding contact; and the region inside the mouth part 46 covering the track grooves 41a in which the torque transmission balls roll. They are both hardened to HRC 58 or more. For the heat treatment, induction hardening is most suitable, as it is capable of local heat application and allows free selection of hardened layer depth, while causing little thermal effects on the mother material of non-hardened parts.

Other parts including the swaged portion 34 of the stem part 45 which will be expanded radially outward by plastic deformation by swaging to be described later are not hardened by heat treatment after forging. Of these non-heat treated parts, the swaged portion 34 should preferably have as low a hardness as possible in view of the workability in swaging, to an extent that does not lead to deterioration of fatigue durability. Thus the preferable range of hardness for the swaged portion 34 is HRC 13 to 28, and more preferably HRC 18 to 25.

The bearing 20 includes an outer member 21 and double-row rollers 22. The outer member 21 includes a flange 23 for attachment onto the vehicle body (not shown) and is formed with double-row outer races 24 on an inner peripheral surface thereof on which the double-row rollers 22 roll. The double-row rollers 22 are accommodated in between the inner races 27, 28 on the wheel hub 10 and the outer joint member 41 and the double-row outer races 24 on the outer member 21. Although this embodiment shows by way of example a double-row angular ball bearing in which rollers 22 are balls, it should be noted that heavy automobile wheel bearing devices often employ double-angular tapered roller bearings, in which case they are tapered rollers. Seals 25, 26 are provided to either open end of the outer member 21 to prevent leakage of grease filled inside the bearing and penetration of water or foreign substance from outside.

The fitting face 16 formed on the inner periphery of the wheel hub 10 is formed with irregularities 31 opposite the swaged portion 34 of the outer joint member 41. The fitting face 16 generally has smooth cylindrical surface other than the portion with the irregularities 31, making tight contact with the cylindrical outer peripheral surface of the stem part 45. The irregularities 31 can be made in various forms such as threads, serration including splines, and diamond-patterned knurls in which a plurality of rows of grooves cross with each other. These irregularities 31 are then hardened by heat treatment to provide HRC 58 or more.

The wheel hub 10 has a partially hardened layer not just in the region covering the irregularities 31 in the inner periphery but also in a region on the outer periphery thereof covering the seal land of the seal 25 over the inner race 27 up to the end face on the inboard side, as indicated by the dotted pattern in FIG. 1. The heat treatment should preferably be achieved by induction hardening for the same reasons as noted above. Making these hardened layers uncontinuous with each other as illustrated can prevent quenching cracks in the wheel hub 10.

The wheel hub 10 and the outer joint member 41 are plastically joined together by swaging. That is, after fitting the stem part 45 of the outer joint member 41 to the inner periphery of the wheel hub 10, the swaged portion 34 of the stem part 45 is plastically deformed radially outward, causing the irregularities 31 to bite into the outer periphery of the swaged portion 34, thereby plastically joining the wheel hub 10 and the outer joint member 41. This coupling determines the distance between the two inner races 27 and 28, and applies a preset preload inside the bearing 20. The plastically joined wheel hub 10 and outer joint member 41 together form an inner member 29 that has the double-row inner races 27 and 28 on the outer peripheries.

The irregularities 31 will hardly yield to the pressure applied by swagging because they are hardened to a high degree as noted above. The swaged portion 34, on the other hand, has a lower hardness than that of the irregularities 31 and high ductility. It can therefore be formed with a larger margin for the swaging without raising the risk of swaging cracks in the stem part 45. Accordingly, the swaging makes the irregularities 31 bite deeply into the swaged portion 34, thereby securing high joint strength between the wheel hub 10 and outer joint member 41.

The swaging is performed using a swaging punch inserted into the bore 48 inside the stem part 45 of the outer joint member 41. That is, after fitting the stem part 45 of the outer joint member 41 to the inner periphery of the wheel hub 10, a swaging punch having a larger outside diameter than the inside diameter of the bore 48 is press-fitted to the bore 48, thereby expanding the swaged portion 34 of the stem part 45 radially outward.

The outer joint member 41 should preferably be formed of a steel material (hereinafter "specific steel") chiefly comprising iron and containing alloying elements of carbon in an amount of 0.5 to 0.7% by weight, silicon in an amount of 0.1 to 1.5% by weight, and manganese in an amount of 0.6 to 1.0% by weight, and other inevitable impurities. More preferably, silicon should be contained in an amount of 0.6 to 1.2% by weight.

Carbon should be contained in an amount ranging from 0.5 to 0.7% for the following reasons: It is known that at least 0.5% or more by weight of carbon is necessary in order to achieve more than a certain degree of hardness with the induction hardening and to secure a certain rolling life of the bearing under large loads and with the condition that the steel contains silicon and manganese in certain amounts. In view of this, carbon should be contained at least in an amount of 0.5% or more. While carbon or carbide contributes to attaining stable hardness, if it is contained in an amount exceeding 0.7%, the material hardness will become too high to the extent that workability is lowered. Furthermore, the steel will have to undergo other expensive heat treatment processes such as high-temperature diffusion heat treatment or soaking for prevention of component segregation and processing for changing carbide particles into spherical shapes. In view of the high cost of these processes, carbon should be contained in an amount not exceeding 0.7%.

Silicon is known as an element that reinforces the base material and increases rolling life. It also suppresses softening under high temperatures and defers structural changes and generation of cracks due to repeated application of large loads. Thus silicon should be contained in an amount of 0.6% or more. While an increase in this amount of silicon will not result in higher hardness of the base material to the same extent as with manganese as described later, cold workability and hot workability may decrease. Thus silicon should be contained in an amount not exceeding 1.2%.

Manganese improves quenching properties of steel. Further, solid solution of manganese in steel strengthens the steel and increases retained austenite which is effective in lengthening rolling life. Not only having the effect of strengthening the base material similarly to silicon, maganese is contained into carbide to increase hardness of carbide. Therefore, while it is effective in increasing material hardness, too much of manganese will result in lowered workability and machinability. In view of these, manganese should be contained in an amount of 0.6 to 1.0%.

When the bearing 20 is subjected to loads and starts to roll, the bearing 20 is subjected to repeated loads even under normal conditions of use, and failures such as flaking on the raceways will eventually occur due to rolling fatigue. The total number of revolutions that 90% of a group of apparently identical bearings operated under the same conditions will meet or exceed without failures due to rolling fatigue is called the "basic rating life ($L_{10}$) of bearing." Bearings in wheel bearing devices are generally desired to have $L_{10}$ of $5000 \times 10^4$ or more in view of their function.

Since sliding in addition to rolling occurs at the raceways 28 and the track grooves 41a of the outer joint member 41, they are susceptible to surface cracks. The induction hardening is performed for hardening these portions as noted above for prevention of this problem, but it may still not be enough to prevent surface cracks. In view of this, the lower limit $\Delta K_{th}$ of stress increase coefficient relative to the progress of tension fatigue cracks in portions that have undergone induction hardening should preferably be set 6.2 MPa$\sqrt{m}$ or more. Steel that satisfies this condition will have higher resistance against generation and progress of fatigue cracks due to repeated tension stress, whereby generation or propagation of surface cracks are deterred in sliding surfaces even under the conditions where the surfaces are subject to repeated tension stress due to sliding in addition to rolling, and overall life of the outer joint member 41 is prolonged.

For the specific steel, medium-carbon steel such as S53C carbon steel for mechanical structure as specified by the Japanese Industrial Standards which contains 0.5 to 0.6% carbon, 0.1 to 0.4% silicon, and 0.6 to 1.0% manganese, or carbon steel that contains 0.5 to 0.6% carbon, 0.7 to 0.9% silicon, and 0.6 to 1.0% manganese can be used. The latter has higher fatigue strength in non-heat treated portions than the former because of the larger amount of silicon.

Any of the above specific steels forming the outer joint member 41 has lower hardness in non-heat treated portions and better workability as compared to high carbon chromium bearing steels such as SUJ2. The swaged portion 34 is therefore readily expanded radially outward by plastic deformation. Swaging is performed with good operability, and reliable joint strength is achieved after the swaging. Furthermore, because thermal refining can be achieved by the induction hardening, troublesome processes such as annealing in the case with dip quenching a high carbon chromium bearing steel, or decarburization process in the case with carburizing a case hardening steel are not necessary, whereby costs are reduced.

Moreover, the specific steels mentioned above do not contain expensive elements such as chromium or molybdenum, so the material cost itself is low, which also leads to the reduction of cost.

Although the above embodiment has shown one example in which the outer joint member 41 is made of the specific steel, the wheel hub 10 can also be made of one of the specific steels mentioned above. The wheel hub 10 needs to have low hardness in portions around bolt holes so that knurls on the wheel hub bolts 15 can firmly engage therewith when bolts 15 are press-fitted to the bolt hole in order to prevent the rotation of the bolt 15. Making the wheel hub 10 from the specific steel while achieving partial hardening as required by induction hardening can reduce the cost because annealing and/or decarburizing process are made unnecessary.

For the same reasons, the outer member 21 can also be made of the specific steel. In this case, a hardened layer may be formed by induction hardening in a region bridging and covering both outer races 24 as indicated by the dotted pattern in FIG. 1.

If all of the outer joint member 41, the wheel hub 10, and the outer member 21 are made of the specific steel, some of the non-heat treated parts, which are relatively weaker, in these members such as base ends A–C of the flanges 14, 23 and various portions D–F on the inner peripheral surface of the outer joint member 41 may be insufficient in fatigue strength, and so these weaker parts should preferably be hardened by heat treatment. This problem, however, can be overcome by using one of the above-mentioned specific steels that has an austenite grain size number of 3 or more. Specific steel having a grain size number of 3 or more will have high fatigue strength even in non-heat treated portions because of the small crystal grain size. The above-mentioned portions A to F will then not have to undergo heat treatment, whereby a further reduction in cost can be achieved. For strict measurement of the austenite grain size, the heat treatment grain size test method as specified in JIS G 0551 or Bechet-Beaujard method may be necessary. In the present invention, however, a simpler measurement method was employed: Mirror finished cross sections of samples are etched by a 5% solution of nitric acid in alcohol to make the ferrite-pearlite structure apparent, and the size of the nodules of pearlite structure surrounded by primary precipitated ferrite that originated from austenite grains is measured using a microscope as an austenite crystal grain.

Figure 4:
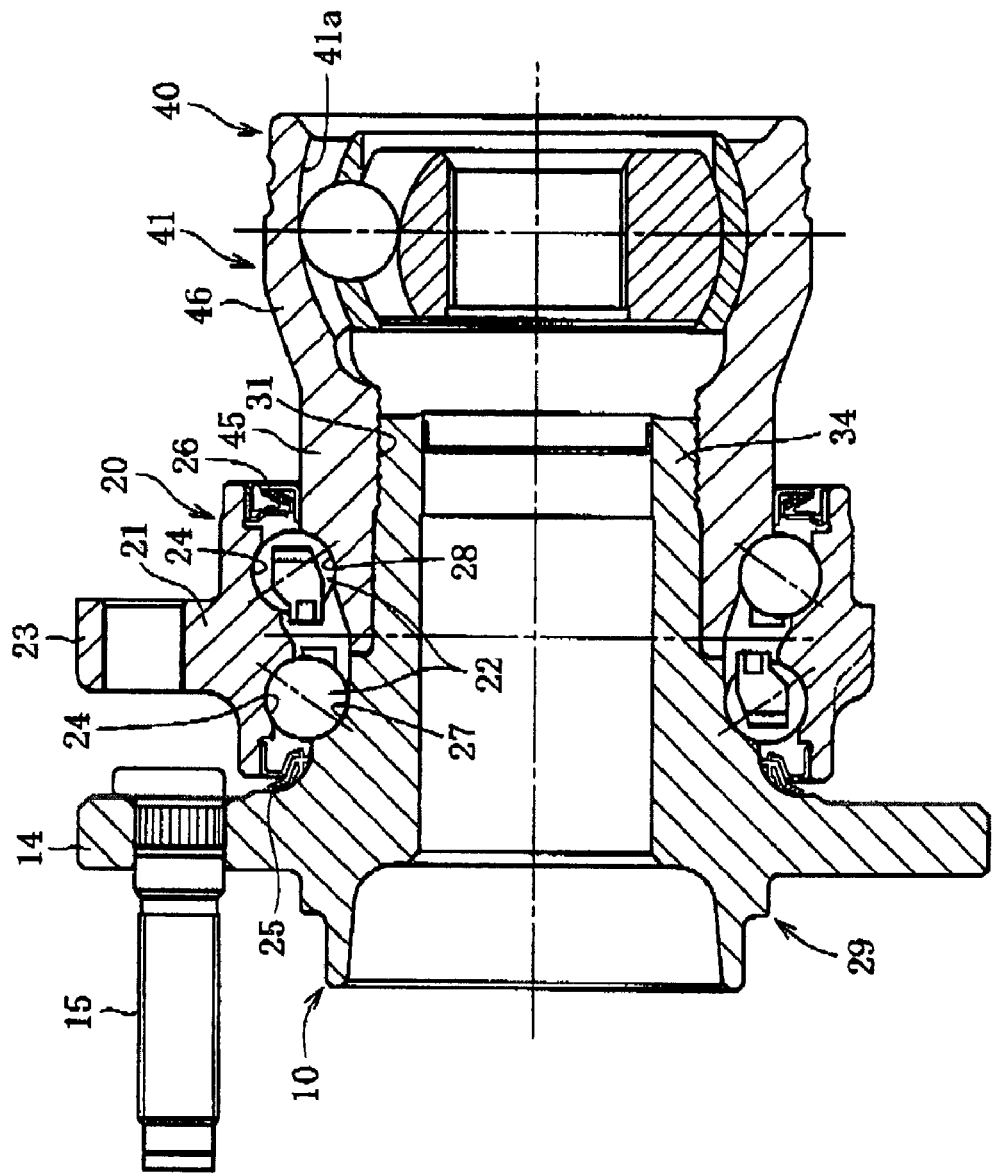
FIG. 4 is a cross-sectional view of a wheel bearing device according to a further embodiment of the invention.

FIG. 1 shows one example in which the wheel hub 10 is arranged outside and the outer joint member 41 inside in the swaged portion. This arrangement can be reversed, as shown in FIG. 4, in which case the wheel hub 10 inside is formed with the swaged portion 34, and the outer joint member 41 is fitted to the outer periphery of that swaged portion.

Other embodiments of the invention will be described next with reference to FIG. 2 and FIG. 3, in which other types of wheel bearing devices are employed. Elements that are common to those shown in FIG. 1 are given the same reference numerals and repeated description thereof will be omitted.

Figure 2:
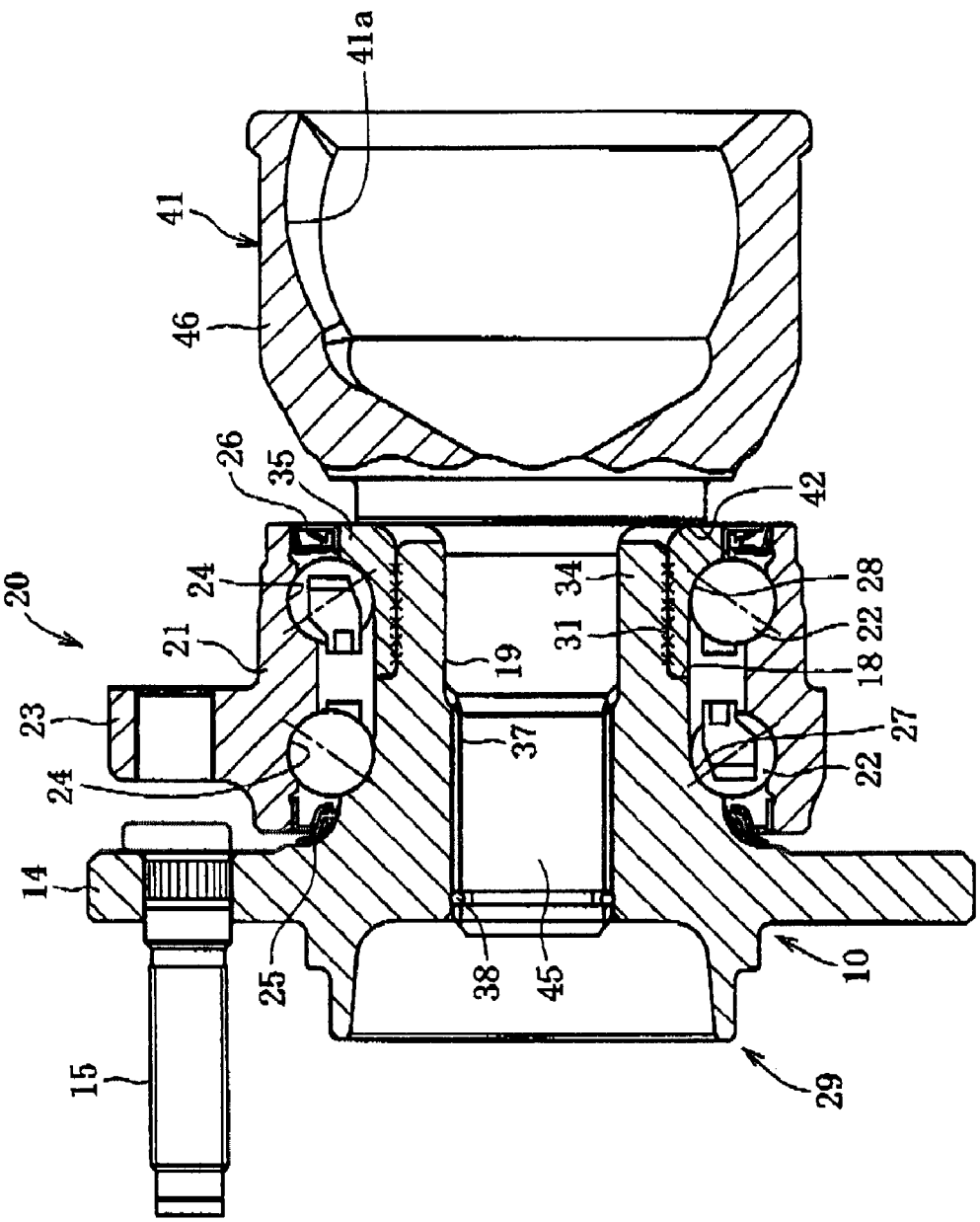
FIG. 2 is a cross-sectional view of a wheel bearing device according to another embodiment of the invention.

FIG. 2 shows one embodiment in which an inner member 29 is constituted by a wheel hub 10 and an inner ring 35 fitted to the outer periphery of the wheel hub 10. The outboard-side inner race 27 is formed on an outer periphery of the wheel hub 10, and the inboard-side inner race 28 is formed on an outer periphery of the inner ring 35.

In this embodiment, the inner ring 35 is press-fitted to an outer periphery of a small-diameter cylindrical portion 19 at the inboard-side end of the wheel hub 10. The outer joint member 41 is fitted to the inner periphery of the wheel hub 10 and joined thereto by torque transmission means 37 such as splines or the like, with a ring 38 for retention on the wheel hub 10. The end face on the inboard side of the inner ring 35 is abutted on the shoulder 42 of the outer joint member 41, and the end face on the outboard side is abutted on the shoulder 18 of the wheel hub 10.

In this embodiment, the swaged portion 34 is formed in the small-diameter cylindrical portion 19 of the wheel hub 10, and the hardened irregularities 31 are formed in the inner periphery of the inner ring 35 in the region indicated by cross marks in FIG. 2. The swaged portion 34 of the wheel hub 10 does not undergo heat treatment, and it is expanded radially outward by plastic deformation, so that the outer periphery of the small-diameter cylindrical portion 19 firmly engages with the irregularities 31 on the inner ring 35, thereby plastically uniting the wheel hub 10 and the inner ring 35. In this case, the inner ring 35 constitutes a fitting member that is fitted to the outer periphery of the wheel hub 10.

In this embodiment, too, one or more of the wheel hub 10, the inner ring 35, the outer member 21, and the outer joint member 41 may be made of the specific steel mentioned above.

Figure 3:
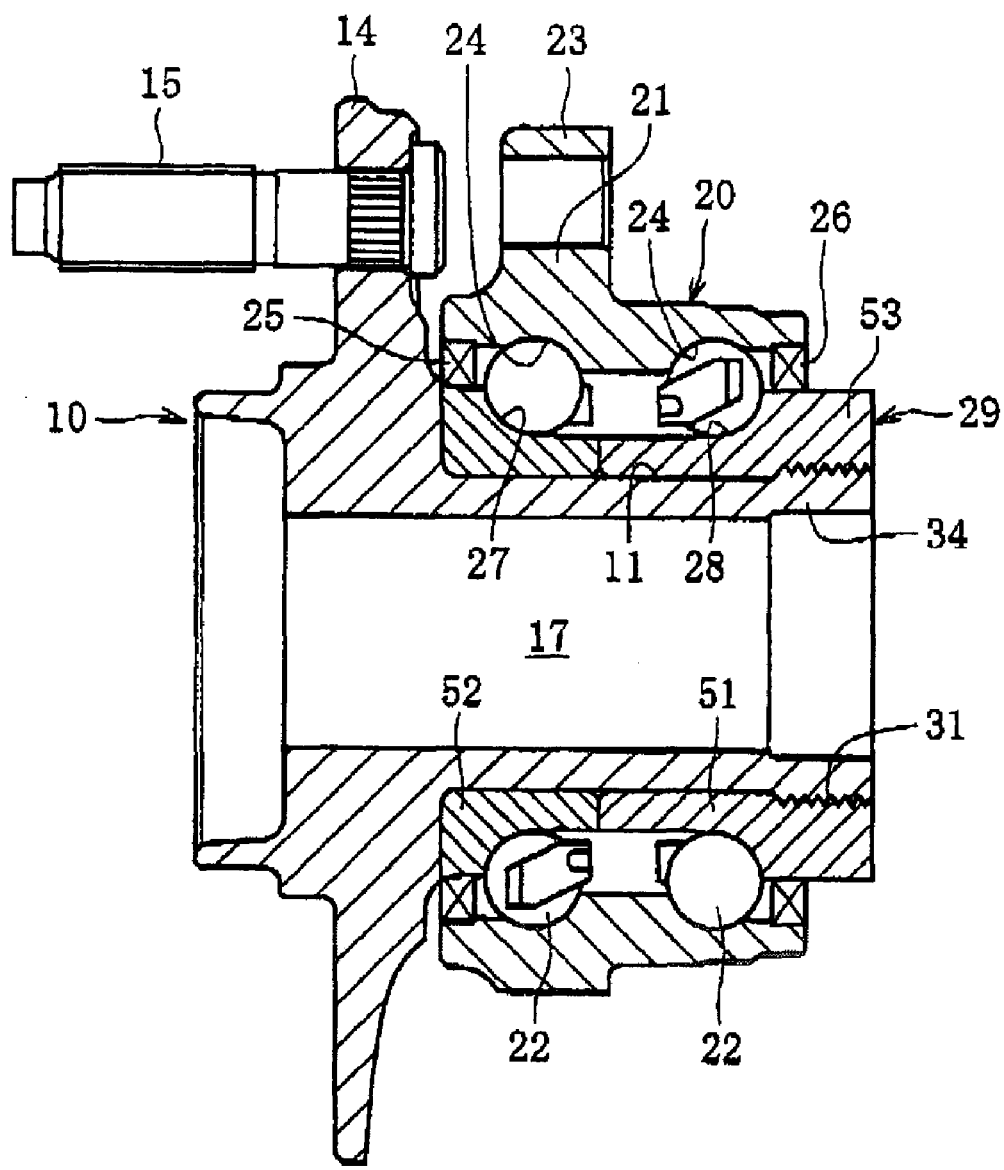
FIG. 3 is a cross-sectional view of a wheel bearing device according to yet another embodiment of the invention.

FIG. 3 shows yet another embodiment in which an inner member 29 is formed by a wheel hub 10, and a first inner ring 51 and a second inner ring 52 both fitted to the outer periphery of the wheel hub 10. The inner member 29 has its inner races 27 and 28 on outer peripheries of the inner rings 51 and 52, respectively. An outer joint member, which is not shown, is fitted to the inner periphery of the wheel hub 10 and operatively connected thereto for allowing torque transmission.

The first inner ring 51 on the inboard side has an axial extension 53 at one end on the inboard side, which is formed with heat treated or hardened irregularities 31 in the inner periphery. The swaged portion 34 is provided at one end on the inboard side of the wheel hub 10, which does not undergo heat treatment so that it is expanded radially outward by plastic deformation and firmly engaged with the irregularities 31, thereby plastically uniting the wheel hub 10 and inner ring 51. In this case, the inner rings 51 and 52 constitute a fitting member that fits to the outer periphery of the wheel hub 10.

In this embodiment, too, one or more of the wheel hub 10, the first inner ring 51, the second inner ring 52, the outer member 21, and the outer joint member may be made of the specific steel mentioned above.

Although FIG. 2 and FIG. 3 show examples of drive wheel bearing devices including the wheel hub 10, the bearing 20, and the outer joint member as one unit, the wheel bearing device of the invention can obviously be applied to a driven wheel, which does not include any outer joint member, but includes only a wheel hub and a bearing.

According to the present invention, steel parts that include both heat treated and non-heat treated portions can be fabricated at low cost, and good workability is secured for plastic deformation of non-heat treated portions. Thereby, low-cost, highly durable wheel bearing devices can be provided.

What is claimed is:

1. A wheel bearing device comprising:
   an outer member formed with double-row outer races on an inner periphery thereof;
   an inner member having a wheel hub having a flange for attachment of a wheel and a fitting member fitted to either one of an inner periphery and an outer periphery of the wheel hub, the inner member being formed with double-row inner races on an outer surface thereof, one of the wheel hub and the fitting member that is located inside being expanded radially outward by plastic deformation, thereby uniting the wheel hub and the fitting member; and
   double-row rollers interposed between the outer races and inner races, wherein at least one of the wheel hub and the fitting member is made of a steel material comprising iron, 0.5 to 0.7 weight % of carbon, 0.1 to 1.5 weight % of silicon, 0.6 to 1.0 weight % of manganese, and inevitable impurities, wherein said steel material has an austenite grain size number of 3 or more.

2. The wheel bearing device according to claim 1, wherein said steel material contains silicon in an amount of 0.6 to 1.2% by weight.

3. The wheel bearing device according to any one of claims 1 to 2, wherein the fitting member is an outer joint member of a constant velocity joint, and the double-row inner races are formed on outer peripheries of the wheel hub and the outer joint member.

4. The wheel bearing device according to any one of claims 1 to 2, wherein the fitting member is an inner ring fitted to the outer periphery of the wheel hub.

5. The wheel bearing device according to claim 4, wherein the double-row inner races are formed on outer peripheries of the wheel hub and the inner ring.

6. The wheel bearing device according to claim 4, wherein the double-row inner races are formed on outer peripheries of two inner rings fitted to the outer periphery of the wheel hub.

* * * * *